(12) United States Patent
Abramson et al.

(10) Patent No.: US 9,871,687 B2
(45) Date of Patent: Jan. 16, 2018

(54) METHOD, CABLE MODEM AND A DEVICE FOR PROVIDING VIDEO TO A CUSTOMER PREMISES EQUIPMENT

(75) Inventors: Howard Abramson, Easton, MA (US); Ran Oz, Modiin (IL); Jay Chambers, Glenpool, OK (US); Mohan Gundu, Shrewsbury, MA (US); Douglas Jones, Boulder, CO (US); Tamir Ostfeld, Kfar Saba (IL)

(73) Assignee: ARRIS Enterprises LLC, Suwanee, GA (US)

( * ) Notice: Subject to any disclaimer, the term of this patent is extended or adjusted under 35 U.S.C. 154(b) by 1083 days.

(21) Appl. No.: 12/503,086

(22) Filed: Jul. 15, 2009

(65) Prior Publication Data

US 2010/0017833 A1    Jan. 21, 2010

Related U.S. Application Data

(60) Provisional application No. 61/081,424, filed on Jul. 17, 2008.

(51) Int. Cl.
| *H04N 21/426* | (2011.01) |
| *H04N 21/61* | (2011.01) |
| *H04N 21/6377* | (2011.01) |
| *H04N 21/472* | (2011.01) |
| *H04L 12/28* | (2006.01) |
| *H04L 27/38* | (2006.01) |
| *H04N 7/16* | (2011.01) |
| *H04N 21/236* | (2011.01) |

(Continued)

(52) U.S. Cl.
CPC .......... *H04L 27/38* (2013.01); *H04L 12/2801* (2013.01); *H04L 65/4092* (2013.01); *H04N 7/162* (2013.01); *H04N 21/2385* (2013.01); *H04N 21/23614* (2013.01); *H04N 21/4263* (2013.01); *H04N 21/42676* (2013.01); *H04N 21/4348* (2013.01); *H04N 21/4383* (2013.01); *H04N 21/6118* (2013.01); *H04N 21/64322* (2013.01); *H04L 65/4084* (2013.01)

(58) Field of Classification Search
CPC .......... H04N 21/6168; H04N 21/6118; H04N 21/42676; H04L 12/2801; H04L 12/289
See application file for complete search history.

(56) References Cited

U.S. PATENT DOCUMENTS 7,978,723 B1 *   7/2011   Beser ............................ 370/431
7,990,951 B2 *   8/2011   Walston et al. ............... 370/352

(Continued)

*Primary Examiner* — Hai V Tran
(74) *Attorney, Agent, or Firm* — Bart A. Perkins

(57) ABSTRACT

A method for providing video to a customer premises equipment, the method includes: receiving, by a radio frequency interface of a cable modem, radio frequency signals; receiving by a data tuner out of multiple tuners of the cable modem, radio frequency signals that convey data; detecting, by a monitor of the cable modem, a request to receive a certain video channel that is being broadcasted; wherein the request is sent to the cable modem from a customer premises equipment; tuning a certain tuner out of multiple tuners of the cable modem, in response to a mapping between radio frequencies and video channels, to receive the certain video channel; filtering out data layer encapsulation information that encapsulates certain video channel information; and transmitting certain video channel information to the customer premises equipment.

11 Claims, 6 Drawing Sheets

(51) Int. Cl.
*H04N 21/2385* (2011.01)
*H04N 21/434* (2011.01)
*H04N 21/438* (2011.01)
*H04N 21/643* (2011.01)
*H04L 29/06* (2006.01)

(56) References Cited

U.S. PATENT DOCUMENTS

| | | | |
|---|---|---|---|
| 2002/0007495 A1* | 1/2002 | Hoath | H04L 12/2801 725/111 |
| 2003/0106067 A1* | 6/2003 | Hoskins et al. | 725/119 |
| 2007/0081537 A1* | 4/2007 | Wheelock | H04L 47/15 370/392 |
| 2007/0186259 A1* | 8/2007 | Pedlow | H04N 5/50 725/120 |
| 2007/0204312 A1* | 8/2007 | Wheelock | 725/94 |
| 2007/0204314 A1* | 8/2007 | Hasek et al. | 725/100 |
| 2008/0209489 A1* | 8/2008 | Joyce et al. | 725/111 |
| 2008/0229379 A1* | 9/2008 | Akhter | H04N 7/17354 725/139 |
| 2008/0273548 A1* | 11/2008 | Leano et al. | 370/442 |
| 2009/0083813 A1* | 3/2009 | Dolce | H04N 7/16 725/93 |
| 2009/0193485 A1* | 7/2009 | Rieger et al. | 725/114 |
| 2009/0222872 A1* | 9/2009 | Schlack | H04N 7/173 725/114 |
| 2009/0310596 A1* | 12/2009 | Joyce | H04L 12/2801 370/352 |
| 2010/0061432 A1* | 3/2010 | Ben-Hamo et al. | 375/222 |
| 2010/0232325 A1* | 9/2010 | Weber | 370/297 |

* cited by examiner

METHOD, CABLE MODEM AND A DEVICE FOR PROVIDING VIDEO TO A CUSTOMER PREMISES EQUIPMENT

RELATED APPLICATIONS

This application claims the benefit of U.S. Provisional Patent Application No. 61/081,424, filed Jul. 17, 2008, the entire contents of which are incorporated herein by reference.

FIELD OF THE INVENTION

The present invention relates to methods and systems for providing internet protocol (IP) information over switched video networks.

INTRODUCTION TO THE INVENTION

Cable operators continue to seek ways to economically provide increased downstream capacity for their networks. The primary driver for this added capacity is the delivery of Internet Protocol (IP) based television (IPTV). That is, delivery of traditional television and multi-media content to IP capable presentation systems. This includes delivering television programs (also referred to as video channels) to Personal Computers (PCs), IP Set-Top-Boxes (IP-STBs) that front-end television monitors, IP capable telephones with integrated monitors, etc. At the same time, these operators have called on the industry to supply more cost effective solutions so that the operators may more effectively compete with alternative service providers (e.g., telephone and satellite companies and the like).

In a Hybrid-Fiber Coax (HFC) network, IP is traditionally delivered through the combination of a cable modem termination system (CMTS) and Cable Modem (CM). The CMTS connects to the Internet via its Network Side Interfaces (NSIs) and to the cable modems (CMs) via its HFC-side interfaces. The cable modem (CM), in turn, connects to a subscriber-side local area network (LAN) to provide residential and commercial internet connectivity to the internet.

Wikipedia defines DOCSIS (Data-Over-Cable Service Interface Specifications) as an international standard developed by CableLabs and contributing companies. DOCSIS defines the communications and operation support interface requirements for a data over cable system. It permits the addition of high-speed data transfer to an existing Cable TV (CATV) system. DOCSIS is employed by many cable television operators to provide Internet access over a HFC network. The first DOCSIS specification was version 1.0, issued in March 1997, with revision 1.1 following in April 1999. Because of increased demand for symmetric services such as IP telephony, DOCSIS was revised to enhance upstream transmission speeds. DOCSIS 2.0 was released in December 2001. IN August 2006 the DOCSIS specification was revised (DOCSIS 3.0) to significantly increase transmissions speeds (this time both upstream and downstream) and introduce support for Internet Protocol version 6 (IPv6). Cross-version compatibility has been maintained across all versions of DOCSIS, with the devices falling back to the highest supported version in common between both endpoints cable modem and CMTS.

The CMTS is typically installed at a cable operator's head end, or main facility, for processing the upstream (i.e., from a subscriber) and downstream (i.e., to a subscriber) transmission of data. In the upstream path, the CMTS down converts and demodulates data signals from subscribers' cable modems to extract the data, and then provides that data to a network (e.g., the Internet). In the downstream path, the CMTS receives data destined for a number of subscribers' cable modems, modulates this data onto an RF carrier, and transmits the modulated carrier downstream over a shared medium (e.g., a hybrid fiber coaxial (HFC) cable network).

The downstream channel can be mapped anywhere in the downstream cable spectrum, from about 50 MHz to 1 GHz or higher. The modulated signals are mapped into 6 MHz television channel slots (primarily in North America) or 8 MHz channels (primarily in Europe and Asia) within this spectrum. Within this spectrum the channels, or capacity, associated with video far exceeds the capacity reserved for HSD (High Speed Data) and VoIP (Voice over Internet Protocol) combined. A typical MSO (multi-service operator) cable plant reserves one to two channels for HSD and VoIP for a given serving area, with expectations to increase this to three or four channels in the future. In this same serving area, video consumes well over 100 channels.

A typical CMTS includes multiple individual cards or blades, each configured with packet processors and media access control (MAC) and physical (PHY) layer circuitry to manage a single downstream data channel and a number (e.g., 4 to 6) of upstream data channels. One card may be sufficient to control communications to/from many cable modems on the network. This configuration is known at an Integrated CMTS (I-CMTS).

CMTS manages both upstream and downstream transmission. The management of upstream transmission is more complex than the management of downstream transmission as upstream transmission can be received from multiple cable modems and the CMTS has control upstream transmission is a very accurate manner in order to optimize the usage of the upstream channels. Upstream management usually involves applying complex and accurate timing schemes that determine when each cable modem shall upstream transmit and requires transmitting transmission grant indications to cable modems, evaluating timing characteristics (such as delay) associated with upstream transmission, and the like.

Due to the cost associated with including the upstream portion of the CMTS (considered to be the more complex aspect of DOCSIS) with the downstream portion of the CMTS, the upstream and downstream PHY have been separated from each other in order to provide a modular CMTS (M-CMTS). An M-CMTS is defined by combining a traditional I-CMTS with another device, an Edge QAM (EQAM).

In M-CMTS, the traditional CMTS provides the core networking, DOCSIS protocol termination, subscriber management, upstream PHY & MAC, and downstream MAC. The EQAM provides the DOCSIS PHY.

The EQAM has traditionally been used to provide Ethernet-to-RF QAM multiplexing and modulation for pure digital video services. Video streams, encoded in Standard for Motion Pictures Expert Group (MPEG) over Ethernet, are received on the NSI by the EQAM. The EQAM processes several aspects of the received video, including but not limited to, recovering the source clock, preparing the clock for reception by subscriber-side STBs, removing jitter associated with Ethernet transport, multiplexing several streams together, and modulating the resulting stream onto the downstream channel. M-CMTS is an extension to EQAM processing capability.

Switched Digital Video (SDV, also referred to as Switched Video) is a network scheme for distributing digital video via a cable network, wherein digital video is sent in more efficient a manner. Contrary to previous Hybrid fiber-coaxial systems wherein a fiber optic node which services any number of homes ranging from 1 to 2000 homes would sent all the channels received from the headend via coaxial cable to each of the homes, channels that are not required by users (i.e. unwatched channels) may not be sent.

Since video is the predominant application in a cable operator's network, EQAM device availability and pricing is superior for the downstream MAC-to-PHY convergence that is common between digital video and DOCSIS.

Current generation CMTS chassis are based on internal switch capacity of between 1 and 2.5 Gbps to each blade. This is true for I-CMTS and M-CMTS. This technology limits the CMTS' ability to provide general high speed data (HSD), telephony or voice over IP (VOIP) and motion picture quality video over IP (IPTV) in standard definition (SD), let alone high definition (HD) encoding. Typically, SD and HD require ~3.5 Mbps and ~20 Mbps, respectively, for each individual video session when encoded in MPEG-2.

Cable operators continue to seek ways to increase this capacity in order to deliver IPTV. One proposed solution is the DOCSIS 3.0 channel bonding initiative advocated by CableLabs. DOCSIS 3.0 bonds multiple physical channels into a single, virtual, high-bandwidth channel. This is achieved by multiplexing several channels to create a single logical channel. The problem with this solution is that it still relies on the capacity and cost restrictions associated with I-CMTS and M-CMTS Core equipment.

SUMMARY OF EMBODIMENTS OF THE INVENTION

A method for providing video to a customer premises equipment, the method includes: (a) receiving, by a radio frequency interface of a cable modem, radio frequency signals; (b) receiving by a data tuner out of multiple tuners of the cable modem, radio frequency signals that convey data; (c) detecting, by a monitor of the cable modem, a request to receive a certain video channel that is being broadcasted; wherein the request is sent to the cable modem from a customer premises equipment; (d) tuning a certain tuner out of multiple tuners of the cable modem, in response to a mapping between radio frequencies and video channels, to receive the certain video channel; (e) filtering out data layer encapsulation information that encapsulates certain video channel information; and (f) transmitting certain video channel information to the customer premises equipment According to an embodiment of the invention the method may include receiving the mapping between radio frequencies and video channels from a cable modem termination system.

According to an embodiment of the invention the method may include detecting a multicast join request that is associated with the certain video channel.

According to an embodiment of the invention the method may include preventing a transmission of the request (a multicast join request) to the cable modem termination system.

According to an embodiment of the invention the method may include encapsulating video channel information by an encapsulation unit, wherein the encapsulating includes adding data layer encapsulation information.

According to an embodiment of the invention the method may include determining, by a modulation unit, a carrier frequency of a radio frequency carrier wave that carries video channel information in response to the mapping between radio frequencies and video channels.

According to an embodiment of the invention the method may include initializing the cable modem. The initializing may include obtaining a mapping data structure that represents a mapping between radio frequencies and video channels. The initializing can also include obtaining update information indicative of a mapping data structure update.

According to an embodiment of the invention the method may include receiving a request to stop a reception of the certain video channel and stopping to filtering out data layer encapsulation information that encapsulates certain video channel information.

A cable modem that includes: (a) a radio frequency interface for receiving radio frequency signals; (b) multiple tuners coupled to the radio frequency interface; wherein at least one tuner is tuned to receive data conveying radio frequency signals sent from a cable modem termination system; (c) a monitor configured to detect a request to receive a certain video channel that is being broadcasted; wherein the request is sent to the cable modem from a customer premises equipment; (d) a video client configured to tune, in response to a mapping between radio frequencies and video channels, a certain tuner of the multiple tuners to receive the certain video channel; (e) a parser, coupled to the certain tuner, configured to filter out data layer encapsulation information that encapsulates certain video channel information; and (e) a customer premises equipment interface configured to receive the request to receive the certain video channel and to transmit certain video channel information to the customer premises equipment.

According to an embodiment of the invention the radio frequency interface may receive the mapping between radio frequencies and video channels transmitted from the CMTS, from the edge QAM or a combination thereof.

According to an embodiment of the invention the monitor may be configured to detect a multicast join request that is associated with the certain video channel.

According to an embodiment of the invention the cable modem may be adapted to prevent a transmission of the request to the cable modem termination system.

A quadrature amplitude modulation device that includes: (a) an input interface for receiving video channel information of multiple broadcast video channels; (b) a storage unit configured to store a mapping between radio frequencies and video channels; (c) an encapsulation unit configured to encapsulate video channel information by adding data layer encapsulation information to video channel information; wherein data layer encapsulation information associated with different broadcast video channels differ from each other; (d) a modulation unit configured to modulate multiple radio frequency carrier waves such as to convey data layer encapsulation information of the different broadcast channels and to convey data layer encapsulation information; wherein a frequency of each of the radio frequency carrier wave is selected in response to the mapping between radio frequencies and video channels; and (e) a transmitter configured to transmit the modulated radio frequency carrier waves.

According to an embodiment of the invention the device may include a switched broadcast unit configured to receive selection information indicative of a sub-set of broadcast video channels to be broadcast to cable modems; wherein the sub-set of broadcast video channels are selected from a set of video channels received by the device; and wherein the encapsulating unit is configured to encapsulate video channel information of the sub-set of broadcast video channels.

A method for switched broadcast, the method includes: selecting a sub-set of broadcast video channels to be broadcast to cable modems; wherein the sub-set of broadcast video channels are selected from a set of broadcast video channels; wherein each video channel of the set is associated with a unique radio frequency; and instructing a quadrature amplitude modulation device to encapsulate video channel information of the sub-set of broadcast video channels.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

DETAILED DESCRIPTION OF THE DRAWINGS

A system, a cable modem and a method are provided. They can reduce the cost of the provision of a video channel to customer premises equipment and, additionally or alternatively, facilitate the provision of a video channel via cable modems by encapsulating video channel information with data layer encapsulation information, transmit video channel information and data layer encapsulation information to cable modems and provide video channel information by the cable modem by using a mapping between video channels and radio frequencies of the transmitted video channels information. The provision of video channel information to customer premises equipment can be managed without involving the cable modem termination system-thus reducing the cost of managing the video sessions.

Figure 1:
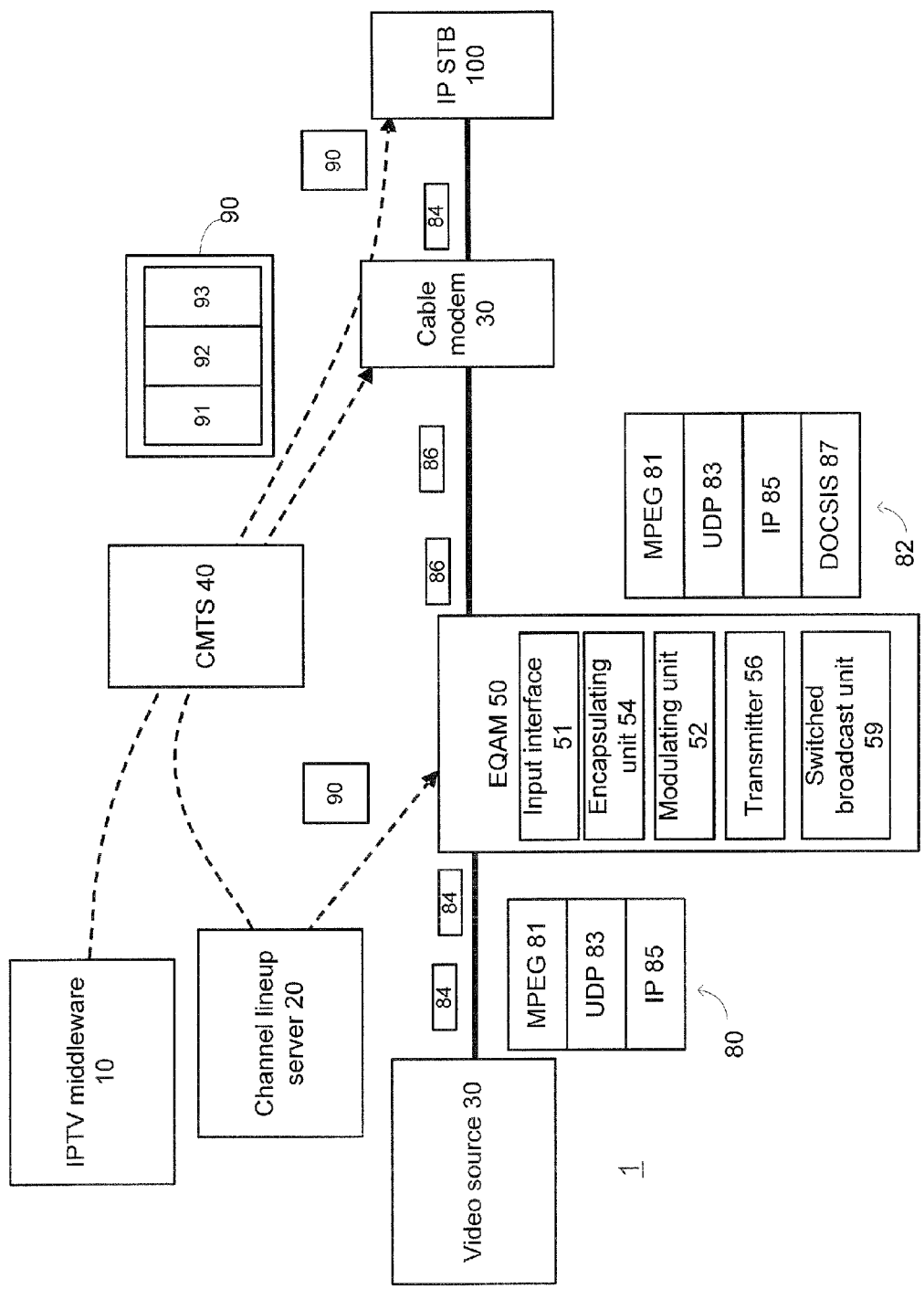
FIG. 1 illustrates a system and various data structures according to an embodiment of the invention.

FIG. 1 illustrates system 1 and various data structures, according to an embodiment of the invention.

System 1 includes cable modem 30, cable modem termination system (CMTS) 40, a customer premises equipment such as IP STB 100, video source 30, IPTV middleware 10 and channel lineup server 20.

EQAM 50 can include: (a) input interface 51 for receiving video channel information of multiple broadcast video channels; (b) storage unit 52 configured to store a mapping between radio frequencies and video channels; (c) encapsulation unit 54 configured to encapsulate video channel information by adding data layer encapsulation information to video channel information; wherein data layer encapsulation information associated with different broadcast video channels differ from each other; (d) modulation unit 52 configured to modulate multiple radio frequency carrier waves such as to convey data layer encapsulation information of the different broadcast channels and to convey data layer encapsulation information; wherein a frequency of each of the radio frequency carrier wave is selected in response to the mapping between radio frequencies and video channels; and (e) transmitter 56 configured to transmit the modulated radio frequency carrier waves.

According to an embodiment of the invention EQAM 50 may include switched broadcast unit 59 configured to receive selection information indicative of a sub-set of broadcast video channels to be broadcast to cable modems. The sub-set of broadcast video channels is selected from a set of video channels received by the device. Switched broadcast unit 59 may instruct encapsulating unit 54 which video channel information to encapsulate (if the video channels belongs to the selected sub set) and which to ignore.

Cable modem 30 can be a DOCSIS compliant cable modem but this is not necessarily so. It can be compliant to either one of DOCSIS 1.0, DOCSIS 1.1, DOCSIS 2.0, or DOCSIS 3.0. It is connected to CMTS 40 and EQAM 50 via HFC network (not shown) and is connected to IP STB 100. CMTS 40 is connected to channel lineup server 20 and IPTV middleware 10. EQAM 50 is also connected to video source 30 and channel lineup server 20.

Video source 30 can be a part of a traditional Switched Digital Video (SDV) infrastructure. The SDV infrastructure also includes other components such as but not limited to a switched broadcast system 23 of FIG. 2.

Cable modem 30 can include a video client such as but not limited to an Internet Protocol over Switched Video (IPSV) client software application. Cable modem 30 may have general internet connectivity through CMTS 40. CMTS 40 can also provide cable modem 30 IPSV information (such as a mapping data structure) that assists in a provision of video channel information to IP STB 100.

IP STB 100 can be connected to another device such as a general purpose television monitor 110, a personal computer (not shown), a storage unit, or another IP compliant display. Cable modem 30 can be connected to IP STB 100 via a residential gateway or other intermediate device.

In one embodiment, the present invention provides a broadcast based solution for linear television over IPTV that by-passes I-CMTS and M-CMTS Core (inclusively denoted CMTS 40) with direct data layer encapsulation (such as Ethernet-to-DOCSIS encapsulation) and modulation by EQAM 50 for forwarding through cable modem 30 to IP STB 100 and video monitor (not shown) that is connected to IP STB 100.

FIG. 1 also illustrates data structures 80 and 82. Data structure 80 is sent from video source 30 to EQAM 50. Data structure 80 is encapsulated by data layer encapsulation information (such as DOCSIS header 87) to provide data structure 82. Both data structures 80 and 82 include MPEG layer 81, UDP layer 83 and IP layer 85. Data structure 80 is conveyed over packets such as packets 84.

Data structures 80 and 82 can be frames. Data structure 82 is segmented to packets that are modulated and carried over radio frequency currier waves to provide radio frequency signals. These radio frequency signals represent packets such as packets 86. They are received by cable modem 30. Cable modem 30 also received data conveying radio frequency signals. Cable modem 30 removes the data layer encapsulation information and sends to IP STB 100 packets 88 that include video channel information.

Cable modem 30 and EQAM 50 can receive a mapping data structure that maps between radio frequencies (radio frequency of a carrier wave the carries information related to a video channel) and video channels.

IP STB 100 receives a mapping of video channel identifier 91, video channel identifier column 92 using any prior art method.

FIG. 1 also illustrates mapping data structure 90. Mapping data structure 90 includes mapping information that maps video channels to radio frequencies of radio frequency carrier waves on which video channel information is carried and to customer and/or video equipment video channel identifiers.

Data structure 90 includes three columns-customer video channel identifier column 91, video equipment channel identifier column 92 and radio frequency column 93.

Customer video channel identifiers are used by a customer when electing a video channel. For example, channel #55 or "CNN" are customer channel identifiers.

Video equipment channel identifiers are used to identify a video channel by video equipment such as cable modem, EQAM and the like. Customer premises equipment such as STB 100 receive a customer video channel identifier and outputs a video equipment channel identifier. For example, a multicast address can be a video equipment channel identifier—a customer may request too view ESPN and IP STB 100 will send a join request that includes a multicast address that is associated with ESPN.

The mapping data structure or at least portions thereof can be sent to modulators, cable modems and customer premises equipment, sending a link (for example—a URL) to a web site that stores that data structure, and the like.

For example, cable modem 30 can receive video equipment channel identifier column 92 and radio frequency column 93. IP STB 100 can receive customer video channel identifier column 91, video equipment channel identifier column 92 and additional information such as additional electronic program guide information. Mapping data structure 90 can be sent via CMTS 40 to cable modem 30.

When a customer requests to view a certain video channel then it sends a request that is converted to a multicast join request by IP STB 100 and is sent to cable modem 30. Cable modem 30 will tune one of its multiple tuners to receive that certain video channel.

Cable modem 30 can be connected one or more upstream channel and additionally or alternatively to one or more and downstream channel(s) associated with the CMTS 40. According to an embodiment of the invention, cable modem 30 only connects with a single, primary, downstream channel to the CMTS 40. Other tuners of cable modem 30 can be used to receive video channel information from EQAM 50.

According to an embodiment of the invention, EQAM 50 broadcasts all channels as multicast packets on the provisioned radio frequencies. When a customer requests to start receiving a video channel he sends IP STB 100 a request to view a video channel that is identified by a customer video channel identifier. IP STB 100 outputs a video equipment channel identifier that may be included in an Internet Group Management Protocol (IGMP) join request to join to a multicast.

The request is intercepted by cable modem 30 and causes cable modem 30 to tune one of its tuners to the radio frequency specified by the mapping data structure such as to be tuned to receive that certain video channel. Additionally or alternatively, cable modem 30 can request the mapping—if it does not currently store such a mapping.

Video Source 30 (also referred to as video source streamer) may distribute all the linear content aggregated from various feeds and address them with Multicast IP addresses. Linear program feeds are video channels that are provided in a linear manner—one frame after the other. The program feeds can also include trick play video channels but this is not necessarily so. Video source 30 can provide one or more multiple program transport streams (MPTSs) that are an aggregation of several single program transport streams (SPTS) encapsulated on same IP multicast address, and can provide different SPTSs that have different IP multicast addresses.

According to an embodiment of the invention, all video channels are encoded with the H.264 AVC or MPEG-2 as a Single Program Transport Stream (SPTS) at a Constant Bit Rate (CBR). It is noted that video channels can be provided at a variable bit rate (VBR). This includes Standard Definition (SDTV) and High Definition (HDTV) formats. SDTV programming is encoded at 3 mbps and HDTV programming is encoded at 10 mbps. It is noted that other protocols or characteristic values may be implemented in other embodiment of the invention. For example, the video feeds can be encoded using variable bit rate encoding, can be encoded by other video encoding schemes, and the like.

Video source 30 may aggregate all linear program feeds and addresses them with a set of pre-provisioned Multicast IP addresses. Each SPTS is pre-provisioned to a unique IP multicast address. The mapping data structure includes a mapping between the unique IP multicast addresses (video equipment identifier) and radio frequency.

IPTV channel lineup server 20 may provide the mapping data structure to EQAM 50 and to cable modem 30.

Figure 2:
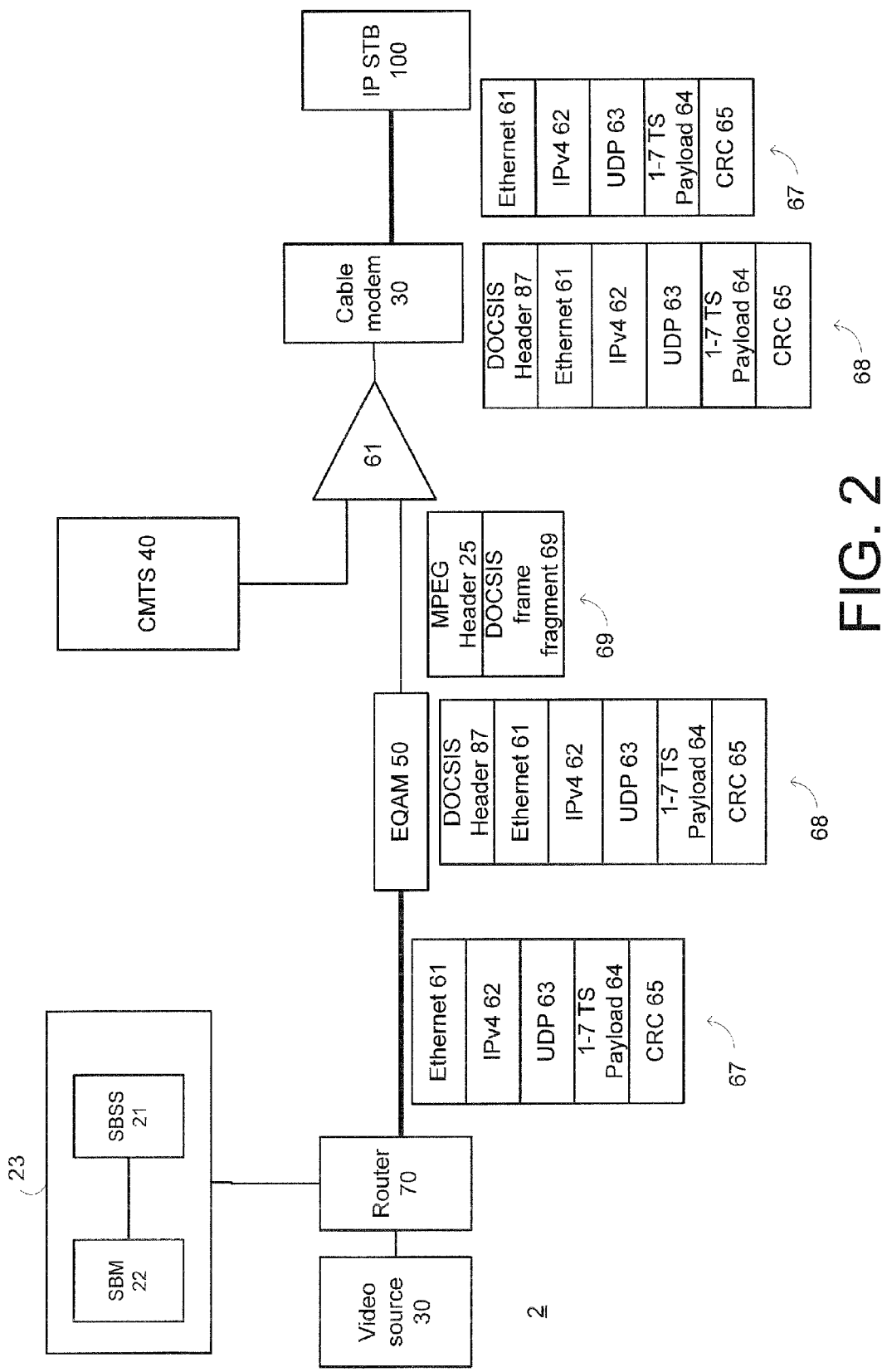
FIG. 2 illustrates a system and various data structures, according to an embodiment of the invention.

FIG. 2 illustrates system 2 and various data structures, according to an embodiment of the invention.

System 2 includes cable modem 30, cable modem termination system (CMTS) 40, switched broadcast system 23, customer premises equipment such as IP STB 100, EQAM 50, router 70, video source 30, radio frequency aggregator 61.

Router 70 is connected between video source 30 and EQAM 50. Switched broadcast system 23 is connected to EQAM 50 and may be connected to CMTS 40—so as to provide CMTS 40 the mapping data structure or information that will allow cable modem 30 to retrieve the mapping data structure. Router 70 can be a ICMPv3 compliant router that is connected via a GBIT Ethernet link to EQAM 50. Router 70 can send video channel information within Ethernet frames such as Ethernet frame 67. EQAM 50 encapsulates the Ethernet frames in DOCSIS frames such as DOCSIS frame 68. The DOCSIS frame 68 is segmented to fragments that are embedded in MPEG transport stream frames 69. Cable modem 30 reconstructs DOCSIS frame 68, and removes DOCSIS header 87 to provide Ethernet frame 67 to IP STB 100.

Ethernet frame 67 and DOCSIS frame 68 include CRC information 65, layers one till seven transport stream payload (1-7 TS Payload) 64, UDP information 63, IPv4 information 62 and Ethernet header 61.

According to an embodiment of the invention, IPTV channel lineup server 20 of FIG. 1 is implemented by switched broadcast system 23 that may include a switched broadcast session server (such as SBSS 21) and a switched broadcast manager (such as SBM 22). SBSS 21 can be included in a BMR of Bigband Networks Inc., California.

SBSS 21 may provide the mapping data structure to EQAM 50. Switched broadcast system 23 may determine which sub-set of programs to broadcast from EQAM 50, which set of programs to include in the mapping data structure, when to accept or reject a request to receive a program that is not included in a sub-set of programs that are being transmitted from EQAM 50, when to change the mapping data structure, when to add to the set of programs another program, when to remove from the set or from the sub-set a program, and the like.

EQAM 50 can multicast all video channels using radio frequencies that are determined by the mapping data structure.

Edge QAM 50 includes encapsulation unit 54 that encapsulates received video channel information (such as data structure 80) using a standard DOCSIS header (DOCSIS 1.x/2.0/3.0, or else, as implemented in the invention). It can also aggregate data structures 82 using MPEG-2 framing with the well known DOCSIS PID and modulate them onto the appropriate radio frequency carrier waves. Edge QAM 50 can encapsulate data structure 80 with a Docsis header, and then restructure it (for example—by using Transport Stream fragmentation technique) to data structure 83.

Cable modem 30 may be based on a fully functional DOCSIS 3.0 cable modem. Cable modem 30 may be adapted to work with the IPTV over SDV solution. On top of the fully functional DOCSIS 3.0 cable modem the IPSV cable modem 30 further includes frequency agile QAM tuners to acquire IPTV programming from EQAM 50 that are on different RF frequencies than high speed data provided by CMTS 40. Cable modem 30 can have a software application which manages the provision of the mapping data structure from channel line up server 20.

IPTV middleware 10 manages the mapping data structure and may provide a mechanism for IP STBs 100 to retrieve this information. The IPTV middleware 10 is pre-provisioned with the mapping data structure.

IPTV STB 100 can be an off-the-shelf STB that issues IGMPv2 membership reports with each request to change a channel. IP STB 100 may be configured to download a soft client and obtain the mapping data structure from IPTV middleware 10. The mapping data structure can include additional information such as electronic program guide information that facilitates a rich electronic programming guide interface to the customer.

This transport takes place over the HFC HSD network provided by the CMTS 40 and the cable modem 30 primary channels.

CMTS 40 may operate in DOCSIS 1.x, 2.0 or 3.0 mode. The CMTS 40 may be used for providing high speed data service to cable modem CM 30. The CMTS 40 and the network connected between CTMS 40 and cable modem 30 may be used for downloading the mapping data structure to cable modem 30 and IP STB 100.

Figure 3:
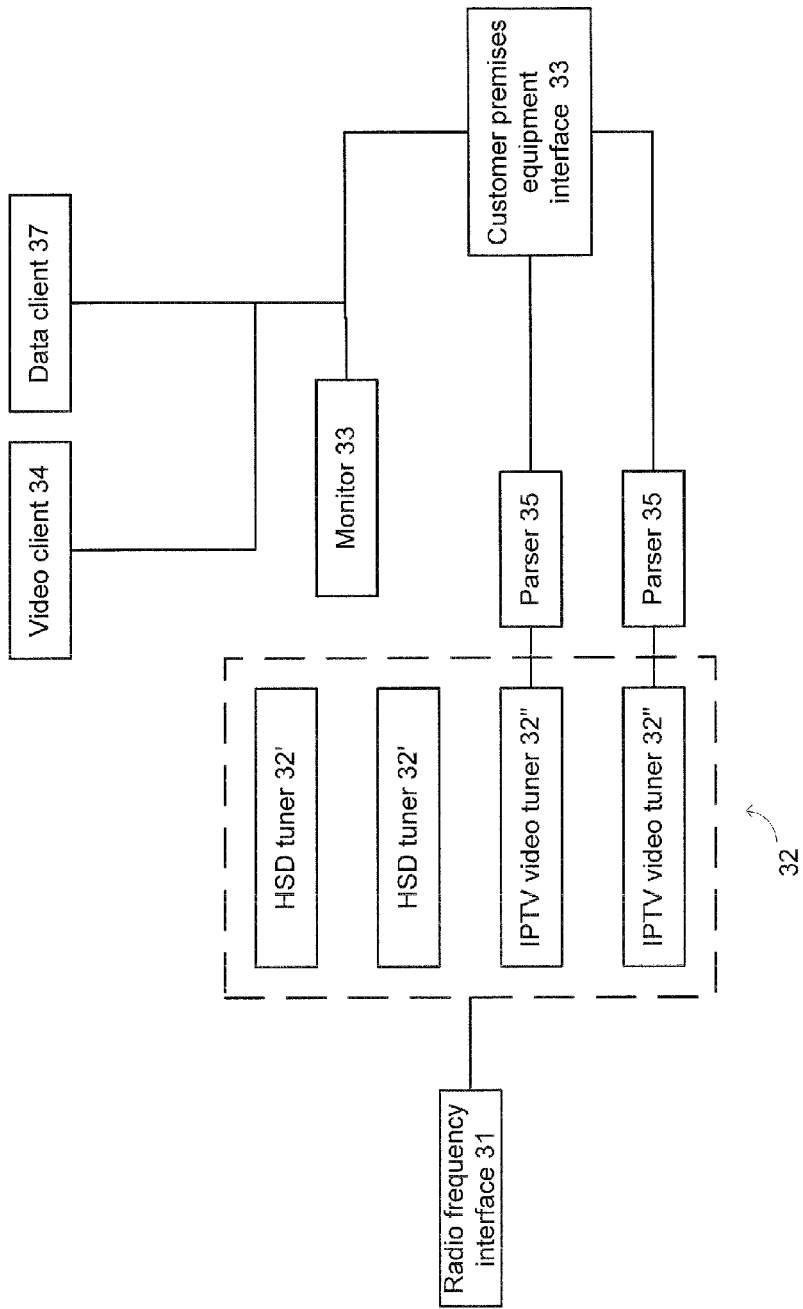
FIG. 3 is a block diagram of a cable modem, according to an embodiment of the invention.

FIG. 3 illustrates cable modem 30 according to an embodiment of the invention.

Cable modem 30 includes radio frequency interface 31, multiple tuners 32, monitor 33, video client 34, parsers 35, data client 37, and customer premises equipment interface 36 (also referred to as CMCI ports).

Tuners 32 are connected to radio frequency interface 31. Tuners 32 include upstream tuners and downstream tuners. Downstream tuners include one or more tuners that are allocated for high speed data (denoted HSD tuner 32') and one or more tuners that are allocated for video channel (denoted IPTV video tuner 32"). The allocation between high speed data tuners and IPTV tuners can change over time but can also remain static.

Each downstream tuner is connected to a parser of parsers 35. Parsers 35 are connected to customer premises equipment interface 36.

HSD tuners 32' can be controlled by data client 37. Data client can be a DOCSIS compliant data client.

Radio frequency interface 31 receives radio frequency signals that may convey data or video channel information.

Monitor 33 may be configured to monitor signals received by customer premises equipment interface 36. FIG. 3 illustrates monitor 33 as being connected to customer premises equipment interface 36. Monitor 33 is configured to detect a request to receive a certain video channel that is being broadcasted. The request is sent to cable modem 30 from a customer premises equipment.

Video client 34 may be configured to tune, in response to a mapping between radio frequencies and video channels, a certain tuner of the multiple tuners to receive the certain video channel.

The parser 35 that is connected to the certain tuner, may be configured to filter out data layer encapsulation information that encapsulates certain video channel information. For example—it can remove DOCSIS header 87.

Customer premises equipment interface 36 may be configured to receive the request to receive the certain video channel and to transmit certain video channel information to the customer premises equipment.

Radio frequency interface 31 may receive the mapping between radio frequencies and video channels from the cable modem termination system.

Monitor 33 may be configured to detect a multicast join request that is associated with the certain video channel.

Cable modem 30 and especially video client may be adapted to prevent a transmission of the request to the cable modem termination system.

It is noted that video client 34 can be implemented in software, hardware firmware or a combination thereof. The same applied to data client 37. Video client 34 can include monitor 33 or have monitoring capabilities.

Data client 37 may be a standard DOCSIS 3.0 compliant software that may control the HSD tuners and the cable modem bridging operation during which video channel information is provided to IP STB 100.

Video client 34 may utilize the services from the DOCSIS 3.0 cable modem stack (and especially utilize the mapping that is provided via data client 37) for controlling IPTV video tuners 32" and for providing video channel information (bridging the IPTV traffic) received from EQAM 50 to IP STB 100.

Cable modem 30 can be initialized during an initialization stage. The initialization stage can follow a reset of cable modem 30 or a power up of cable modem 30.

Cable modem 30 may be initialized according to any DOCSIS specification but this is not necessarily so. During a DOCSIS compliant initialization cable modem 30 is tuned to a primary channel in order to exchange information from CMTS 40.

CMTS 40 may send cable modem 30 allocation information that determined which tuners of cable modem 30 are to be used as HSD tuners and which are to be used as IPTV video tuners. During the initialization stage cable modem can receive a configuration file that include the mapping data structure or a link (or other retrieval information) that allows cable modem 30 to obtain the mapping data structure.

According to an embodiment of the invention, the configuration file includes a URL providing the location and name of the mapping data structure and a time interval for periodic download of this mapping data structure.

According to an embodiment of the invention the configuration includes information to discover channel lineup server and subsequently gather the mapping data structure.

According to an embodiment of the invention the mapping data structure is an XML file that includes the mapping between multicast group information and radio frequency. It is noted that the cable modem 30 may have to periodically download the mapping data structure for obtaining updates. In a switched broadcast environment channel switches can require to change the mapping data structure—especially if a channel that was not mapped is being requested by the customer.

According to an embodiment of the invention the CM configuration file includes the receive channel information reserved for HSD and IPTV.

According to an embodiment of the invention IP STB 100 receives an Electronic Programming Guide (EPG) originated from IPTV middleware 10. The EPG can be included in the mapping data structure but can also include information not included in the mapping data structure that is send to EQAM 50. For example—EPG information that describes the content of video channels, information relating to a broadcast scheduler (future programs) and the like.

When a customer requests to change a channel (start receiving a new video channel) the IP STB 100 issues an IGMP membership report to join the multicast group associated with that video channel. An IGMP leave is sent from IP STB 100 when a customer tunes out of a video channel.

The configuration file may include a multicast group range used for IPTV service. Cable modem 30 may use this multicast group range to determine if an IPTV rules should be applied when it receives IGMP messages at its customer premises equipment interface 36.

Monitor 33 implements, according to an embodiment of the invention, IGMP snooping for monitoring the multicast membership activity on customer premises equipment interface 36.

When cable modem 30 receives an IGMP join that falls within the IPTV multicast group range, it may install a multicast filter to enable the provision of video channel information to IP STB 100 (perform bridging of multicast traffic) and tune an tuner out of IPTV video tuners 32" to receive the channel information and provide it to parser 35.

When the CM 30 receives an IGMP leave that falls within the IPTV multicast group range, it removes the multicast filter.

According to an embodiment of the invention, cable modem 30 does not forward the IGMP messages to CMTS 40 if the multicast address falls in the IPTV multicast group range.

Cable modem 30 conveniently follows data transfer rules (such as standard DOCSIS rules) if it receives an !GMP join or leave message for multicast addresses that do not fall within the IPTV multicast group range.

CM 30 is expected to maintain active membership status in relation to CMTS 40 and this can be accomplished by requesting IP STB 100 to report active membership for its IPTV sessions.

According to an embodiment of the invention, CM 30 can transmit IGMP queries on its CMCI after the DOCSIS registration is completed.

The video channels (also referred to as IPTV programs) may be carried over different radio frequency carrier waves—distributed over multiple QAM channels Each video channel typically consumes 3.5 Mbps for SDTV and 10 Mbps for HDTV using MPEG2coding.

When IPTV STB 100 requests a video channel, cable modem 30 uses the mapping data structure to determine if an RF frequency change is required to bridge the multicast packets.

Figure 4:
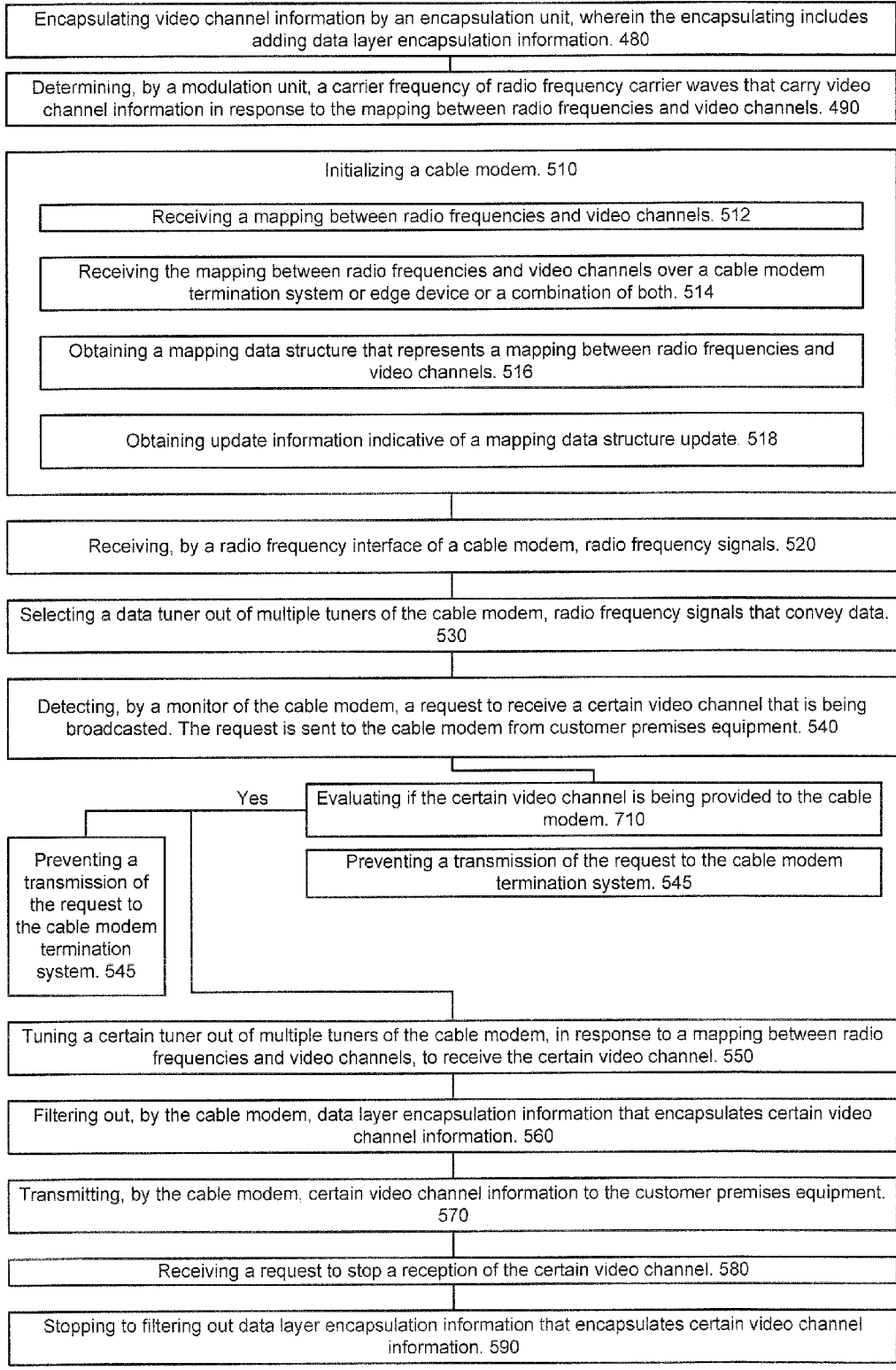
FIG. 4 is a flow chart of a method according to an embodiment of the invention.

FIG. 4 is a flow chart of method 500 according to an embodiment of the invention.

Method 500 starts by stage 510 of initializing a cable modem.

Stage 510 can include either one of the following stages or a combination thereof: (i) stage 512 of receiving a mapping between radio frequencies and video channels; (ii) stage 514 of receiving the mapping between radio frequencies and video channels from a cable modem termination system; (iii) stage 516 of obtaining a mapping data structure that represents a mapping between radio frequencies and video channels; (iv) stage 518 of obtaining update information indicative of a mapping data structure update.

Stage 510 is followed by stage 520 of receiving, by a radio frequency interface of a cable modem, radio frequency signals.

Stage 520 is followed by stages 530 and 540.

Stage 530 includes receiving by a data tuner out of multiple tuners of the cable modem, radio frequency signals that convey data.

Stage 540 includes detecting, by a monitor of the cable modem, a request to receive a certain video channel that is being broadcasted. The request is sent to the cable modem from a customer premises equipment.

The customer can send such a request is wishes to view a new video channel—if he wants to perform a channel switch. In this case a tuner that was tuner to the previous video channel will be tuned to a new channel.

Figure 6:
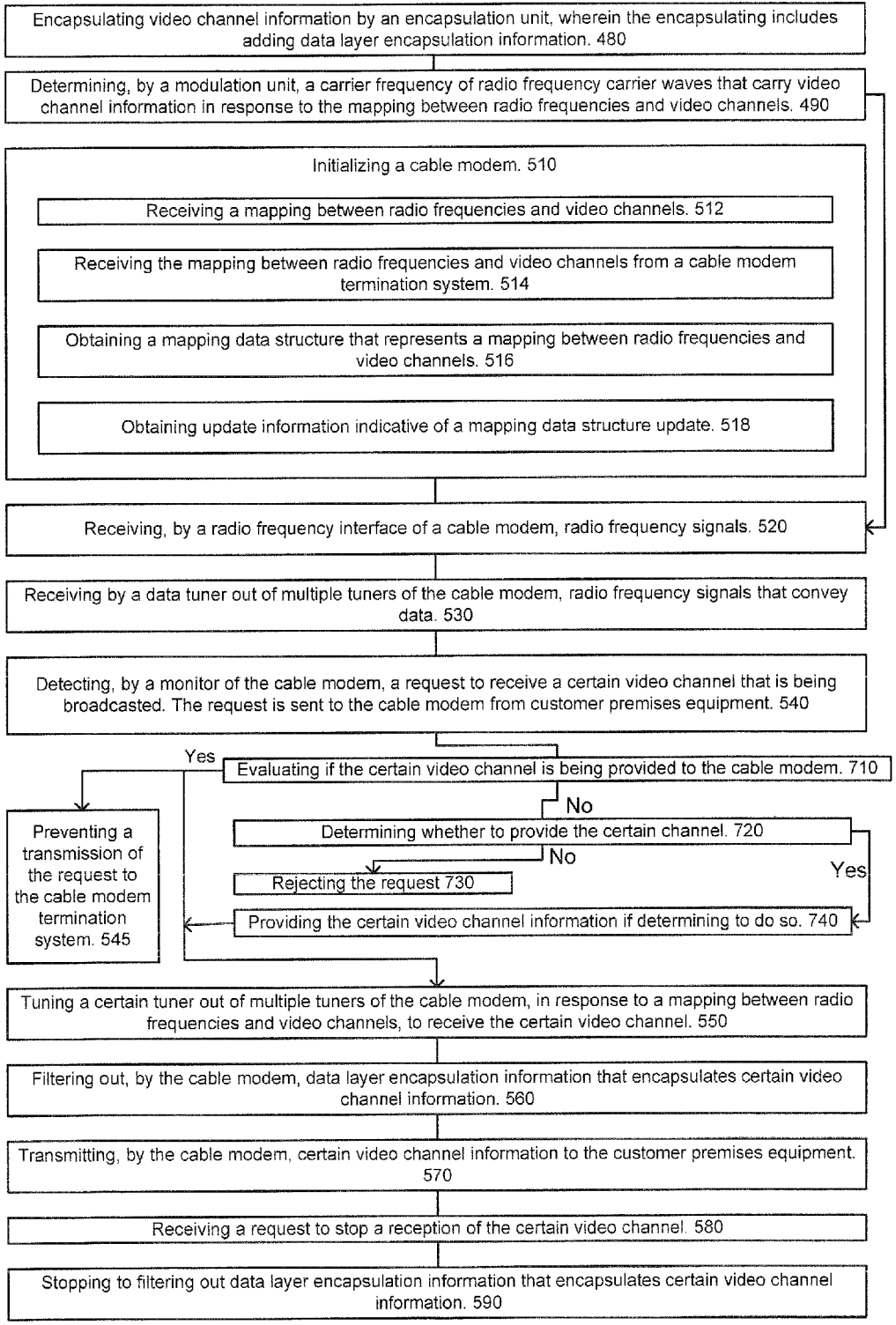
FIG. 6 is a flow chart of a method according to an embodiment of the invention.

If, for example, the customer requests to view a channel that is not currently provided to the cable modem (this can occur in a switched broadcast environment) then a switched broadcast manager has to decide whether to accept the request and provide the requested video channel to the cable modem or reject the request and deny the customer from receiving the requested channel. This process is illustrated by stages 710-740 of FIG. 6. Stage 710 includes evaluating if the certain video channel is being provided to the cable modem, Stage 720 includes determining whether to accept the request—wherein the determination is executed if the certain video channel is not currently being provided to the cable modem. Stage 730 includes rejecting the request if determining not to provide the certain channel. Stage 740 includes providing the certain video channel information if determining to do so. Stage 740 is followed by stage 550. If the certain video channel information is already provided to the cable modem then stage 710 is followed by stage 550.

Referring back to FIG. 4, stage 540 can include detecting a multicast join request that is associated with the certain video channel. The multicast join request can be an IGMPv2 membership report request.

Stage 540 is followed by stage 550 of tuning a certain tuner out of multiple tuners of the cable modem, in response to a mapping between radio frequencies and video channels, to receive the certain video channel.

Stage 550 is followed by stage 560 of filtering out, by the cable modem, data layer encapsulation information that encapsulates certain video channel information.

Stage 560 is followed by stage 570 of transmitting, by the cable modem, certain video channel information to the customer premises equipment.

Stage 540 can also be followed by stage 545 of preventing a transmission of the request to the cable modem termination system. The prevention reduces the load from the cable modem termination system that does not manage the provision of video to the cable modem.

Stage 560 can be followed by stage 570 of receiving a request to stop a reception of the certain video channel, Stage 570 is followed by stage 580 of stopping to filtering out data layer encapsulation information that encapsulates certain video channel information.

The radio frequency signals that are received during stage 520, by a radio frequency interface of a cable modem, can be provided over a network (such as a HFGC network) by a modulation unit that can be included in an edge QAM. The modulation unit can be preceded by an encapsulation unit. The encapsulation unit can belong to the edge QAM but this is not necessarily so.

Conveniently, stage 520 is preceded by stages 480 and 480. Stage 480 includes encapsulating video channel information by an encapsulation unit, wherein the encapsulating includes adding data layer encapsulation information. Stage 490 includes determining, by a modulation unit, a carrier frequency of radio frequency carrier waves that carry video channel information in response to the mapping between radio frequencies and video channels. Stage 490 also includes modulating the carrier wave to provide the radio frequency signals and transmitting these radio frequency signals to the cable modem. The cable modem receives these radio frequency signals during stage 520.

Figure 5:
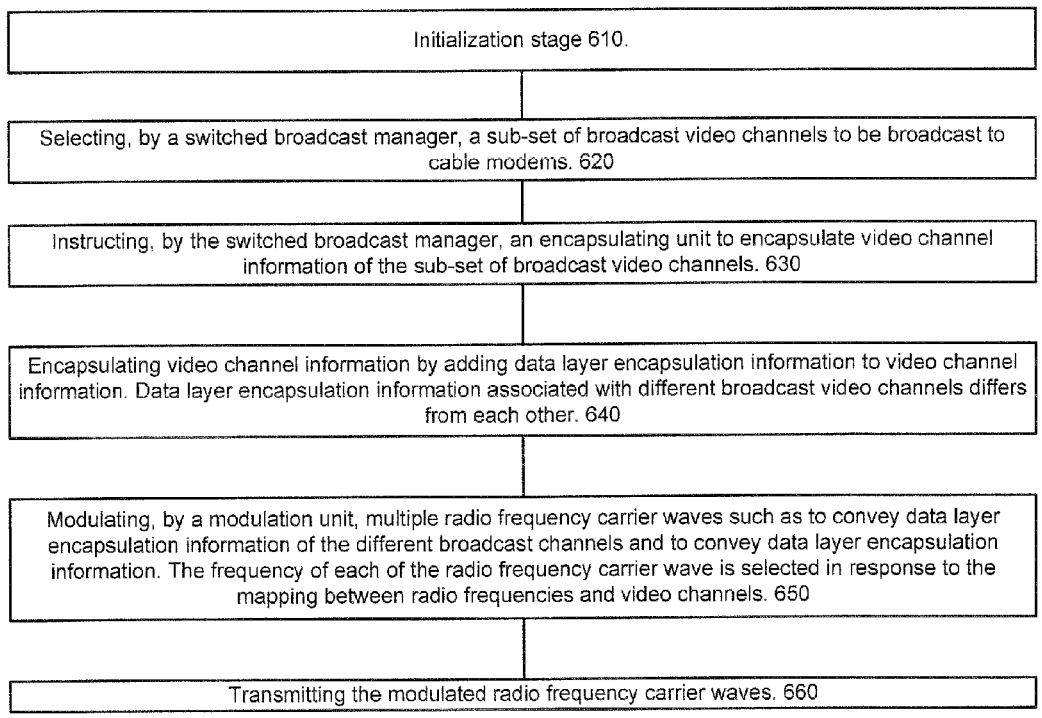
FIG. 5 is a flow chart of a method according to an embodiment of the invention.

FIG. 5 is a flow chart of method 600 according to an embodiment of the invention.

Method 600 starts by initialization stage 610. During the initialization stage a mapping between radio frequencies and video channels is distributed to modulators, cable modems and customer premises equipment. Stage 610 can also include sending a mapping between customer video channel identifiers and video equipment channel identifiers.

Stage 610 can involve sending a mapping data structure to modulators, cable modems and customer premises equipment, sending a link to a web site that stores that data structure, and the like. Stage 610 can utilize the CMTS and especially the links between the CMTS and the cable modem. The mapping data structure also includes a mapping between video equipment channel identifiers and radio frequencies.

Method 600 can facilitate switched broadcast. Switched broadcast involves selecting which video channels to transmit to customers. The selection can be responsive to requests to view video channels, customers viewing patterns, priorities assigned to different video channels, and the like.

Conveniently, stage 610 is followed by stage 620 of selecting, by a switched broadcast manager, a sub-set of broadcast video channels to be broadcast to cable modems. Stage 620 can include or be preceded by receiving requests to view certain video channels.

The sub-set of broadcast video channels is selected from a set of broadcast video channels; wherein each video channel of the set is associated with a unique radio frequency. The unique radio frequency is determined by the mapping that was distributed during stage 610.

Stage 620 is followed by stage 630 of instructing, by the switched broadcast manager, an encapsulating unit to encapsulate video channel information of the sub-set of broadcast video channels.

Stage 630 is followed by stage 640 of encapsulating video channel information by adding data layer encapsulation information to video channel information. Data layer encapsulation information associated with different broadcast video channels differs from each other.

Stage 640 is followed by stage 650 of modulating, by a modulation unit, multiple radio frequency carrier waves such as to convey data layer encapsulation information of the different broadcast channels and to convey data layer encapsulation information. The frequency of each of the radio frequency carrier wave is selected in response to the mapping between radio frequencies and video channels.

Stage 650 is followed by stage 660 of transmitting the modulated radio frequency carrier waves.

Stage 660 can be followed by stages 520-590 of method 500.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A method for providing video to a customer premises equipment, the method comprising:
    receiving radio frequency signals at a radio frequency interface of a cable modem located at a customer premise, wherein the cable modem receives communications from a cable modem termination system (CMTS) and a quadrature amplitude modulation (QAM) device;
    receiving by a data tuner out of multiple tuners of the cable modem, radio frequency signals that convey data;
    detecting, by a monitor of the cable modem, a request to receive a certain video channel that is being broadcast, wherein the request is sent to the cable modem from an internet protocol set top box, wherein the request comprises an Internet group management protocol (IGMP) join request, the IGMP join request comprising a video equipment channel identifier associated with the certain video channel, and wherein the request is for delivery of the certain video channel from the CMTS;
    based upon mapping data that is received at the cable modem from the CMTS and that comprises a mapping between radio frequencies and video equipment channel identifiers and an identification of the video equipment channel identifier associated with the certain video channel within the mapping data, determining that the certain video channel is being provided to the cable modem;
    based on the determination that the certain video channel is being provided to the cable modem, tuning a certain tuner out of multiple tuners of the cable modem, in response to the mapping between radio frequencies and video equipment channel identifiers, to receive the certain video channel in a data over cable service interface specification (DOCSIS) format, wherein the certain tuner is tuned to a radio frequency associated with the video equipment channel identifier associated with the certain video channel according to the mapping data, wherein the certain video channel is retrieved by the cable modem from the QAM device, the QAM device receiving content associated with the certain video channel from a switched digital video source, and wherein the certain video channel is delivered to the cable modem as certain video channel information that is encapsulated with data layer encapsulation information;

preventing the request for the certain video channel from being transmitted to the CMTS;

removing data layer encapsulation information that encapsulates the certain video channel information at the cable modem to produce an internet protocol video signal at the cable modem; and transmitting the certain video channel information from the cable modem, the certain video channel information comprising the internet protocol video signal produced by the removal of the data layer encapsulation information, and the certain video channel information being transmitted to the internet protocol set top box.

2. The method according to claim 1 comprising receiving the mapping between radio frequencies and video channels from a cable modem termination system.

3. The method according to claim 1 comprising detecting a multicast join request that is associated with the certain video channel.

4. The method according to claim 1 comprising encapsulating the certain video channel information by an encapsulation unit, wherein the encapsulating comprises adding the data layer encapsulation information.

5. The method according to claim 1 comprising determining, by a modulation unit, a carrier frequency of radio frequency carrier waves that carry the certain video channel information in response to the mapping between radio frequencies and video channels.

6. The method according to claim 1 comprising initializing the cable modem; wherein the initializing comprises obtaining a mapping data structure that represents a mapping between radio frequencies and video channels; and obtaining update information indicative of a mapping data structure update.

7. The method according to claim 1 comprising receiving a request to stop a reception of the certain video channel and stopping the removal of data layer encapsulation information that encapsulates the certain video channel information.

8. A cable modem comprising:

a radio frequency interface for receiving radio frequency signals, wherein the radio frequency interface receives communications from a cable modem termination system (CMTS) and a quadrature amplitude modulation (QAM) device;

multiple tuners coupled to the radio frequency interface, wherein at least one tuner is tuned to receive data conveying radio frequency signals sent from the CMTS;

a monitor that detects a request to receive a certain video channel that is being broadcast, wherein the request comprises an Internet group management protocol (IGMP) join request, the IGMP join request comprising a video equipment channel identifier associated with the certain video channel, wherein the request is sent to the cable modem from a customer premises equipment, and wherein the request is for delivery of the certain video channel over a radio frequency signal sent from the CMTS, wherein the monitor determines that the certain video channel is being provided to the cable modem;

a video client that responds to the determination that the certain video channel is being provided to the cable modem and a mapping between radio frequencies and video channels by tuning a certain tuner of the multiple tuners to receive the certain video channel, wherein the mapping between radio frequencies and video channels is based on mapping data received at the cable modem from the CMTS, wherein the certain video channel is received from the QAM device, the QAM device receiving content associated with the certain video channel from a switched digital video source, and wherein the certain video channel is received as certain video channel information that is encapsulated with data layer encapsulation information;

a parser, coupled to the certain tuner, that removes data layer encapsulation comprising data over cable service interface specification (DOCSIS) information that encapsulates the certain video channel information; and an internet protocol set top box interface that receives the request to receive the certain video channel and to transmit the certain video channel information in an internet protocol format to the internet protocol set top box.

9. The cable modem according to claim 8 wherein the radio frequency interface receives the mapping between radio frequencies and video channels from the cable modem termination system.

10. The cable modem according to claim 8 wherein the monitor is configured to detect a multicast join request that is associated with the certain video channel.

11. The cable modem according to claim 8, wherein the cable modem prevents a transmission of the request to the cable modem termination system.

* * * * *